United States Patent [19]

Body

[11] 4,157,746

[45] Jun. 12, 1979

[54] BRAKE BAND END CONNECTION

[75] Inventor: Alexander S. Body, Livonia, Mich.

[73] Assignee: D.A.B. Industries, Inc., Troy, Mich.

[21] Appl. No.: 860,929

[22] Filed: Dec. 15, 1977

Related U.S. Application Data

[63] Continuation of Ser. No. 737,694, Nov. 1, 1976, abandoned.

[51] Int. Cl.² .............................................. F16D 49/08
[52] U.S. Cl. ................................ 188/77 R; 188/250 F; 192/80
[58] Field of Search ................... 188/77 R, 77 W, 249, 188/250 R, 250 B, 250 F, 250 H, 259; 192/80, 107 T

[56] References Cited

U.S. PATENT DOCUMENTS

| 1,406,440 | 2/1922 | Brownfield | 188/249 |
| 2,513,192 | 6/1950 | McFarland | 188/77 R |
| 2,768,714 | 10/1956 | Holdeman et al. | 188/259 |
| 3,196,986 | 7/1965 | Lowey | 188/77 R |
| 3,842,952 | 10/1974 | Cook | 188/249 |

Primary Examiner—Edward R. Kazenske

[57] ABSTRACT

A brake band is provided which is useful particularly in connection with transmissions. The band has welded at each free end thereof a bracket. The brackets are provided with recesses to receive the actuating struts which abut against one end of the recesses to cause closing of the band in a drum.

5 Claims, 4 Drawing Figures

U.S. Patent  Jun. 12, 1979  4,157,746

BRAKE BAND END CONNECTION

This is a continuation of application Ser. No. 737,694, filed Nov. 1, 1976, now abandoned.

BACKGROUND OF THE INVENTION

In the past, brake bands of the type presently contemplated have been in widespread use. One conventional brake band design incorporates forged brackets which are butt-welded to the free ends of the band. The brackets have required machining operations. Such bands have been satisfactory in use. However, they are relatively high in cost and there has been a desire to produce a brake band which is effective in use but of lower cost.

One proposed construction is illustrated in U.S. Pat. No. 3399749. In this construction, stamped brackets are welded on the outer surfaces adjacent the free ends of the band. A lug is folded upwardly from the material of the bracket. This lug forms abutment structure for the actuating struts.

Several problems have been encountered with such structures. The upstanding nature of the lugs inherently results in a bending force being applied to the lugs. This has resulted in failure of lugs during use of the band. Additionally, the resulting lifting force has caused, in some cases, separation of the bracket from the band at the weld points. Further, there has been excessive toe-in at the ends of the bracket resulting in premature wearing of the friction material provided on the working surface of the band.

In accordance with the present invention a brake band structure is provided incorporating the desirable cost-saving feature of welding brackets to the surface of the free ends of the brake band while at the same time providing a brake band which is as durable and effective in use as previous forged constructions.

A recess is provided on each bracket. The actuating struts are received in the recesses and abut directly against end portions of the recesses. The force that is applied is substantially a line contact force in a direction substantially tangential to the circle defined by the drum. This inherently reduces bending forces.

Additionally, by this construction, the material in front of the actuating element is substantially under pure compression while material behind is in substantially pure tension. The weld points are in substantially pure shear. No area of the bracket is under any substantial turning force. This minimizes possible failure of the bracket and also minimizes any forces tending to lift the bracket from the band.

Additionally, toe-in of the free ends of the band is minimized. The actuating struts are applied at substantially the outer surface of the band material. This places the actuating struts closer to the drum surface thereby reducing turning movement of the brake band with resultant minimizing of toe-in at the free ends of the band. Further, in absence of a lug, there is no additional force caused by the bending moment applied to the lug which, in the past, has aggravated the problem of toe-in. Repeated toe-in also results in fatigue of the band material which, in some cases, causes the band itself to fail.

IN THE DRAWING

Figure 1:
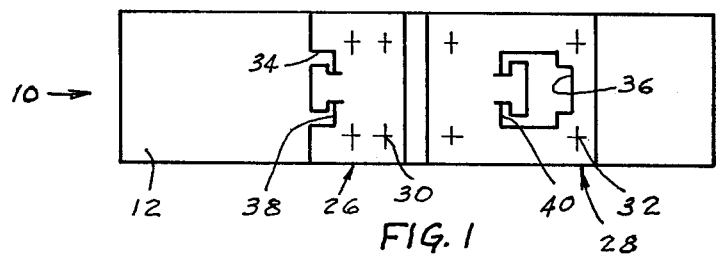
FIG. 1 is a plan view of a brake band in accordance with one embodiment of the present invention.
Figure 2:
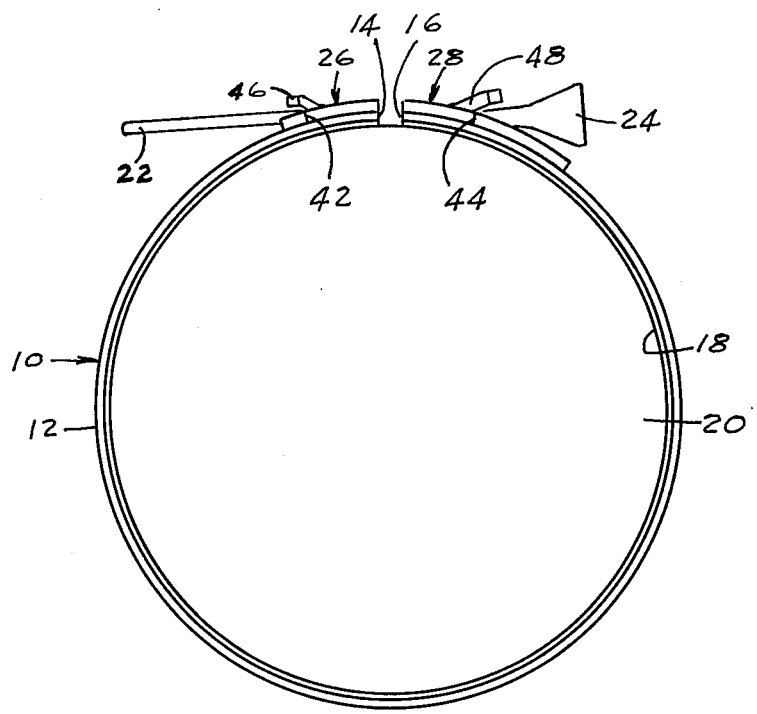
FIG. 2 is a side elevational view of the band of FIG. 1 illustratively mounted on a drum with the actuating struts in place.
Figure 3:
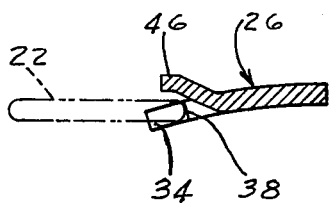
FIG. 3 is an enlarged view of the upper left hand bracket of FIG. 2.

Referring to FIGS. 1–3, the brake band 10 comprises an annular band 12 and free ends 14, 16. The band normally flexes outwardly leaving a gap between the free ends. The band 12 may be fabricated from conventional carbon steels. A layer of friction material 18 is adhered to the inner surface of the band 12. As will be noted in FIG. 2, the band is normally received on a circular drum 20. In operation, when the free ends 14, 16 of the band are forced towards each other, by means of struts 22, 24, the brake material 18 engages the drum 20 causing the drum to stop rotating.

A bracket 26, 28 comprises essentially plate portions which are secured to the outer surface of the band 12 adjacent the free ends 14, 16 as by welding at 30, 32 so that the plate portions be entirely on the band 12. One of the brackets 26 receives the apply strut 22. This strut 22 is selectively actuated by means (not shown) to cause tightening of the band on the drum. The anchor strut 24 is received on the other bracket 28. The anchor strut 24 is fixedly mounted in structure (not shown).

Each of the brackets is provided with a recess 34, 36. The surface portions 38, 40 define abutment surfaces for line contact engagement with the rounded ends 42, 44 of the struts. As will be noted, the surface portions 38, 40 are transverse surfaces of the thickness of the plate portions and are thus upstanding integral abutment surface portions extending directly from the band 12 and transverse thereof. Up-standing locator elements 46, 48 are struck from the material of each bracket and thus are physically separate from the abutment surface portions 38, 40 and out of alignment therewith, the function of these elements is to guide these struts into contact with surfaces 38, 40 and to prevent escape of the struts radially outwardly from the brackets when no force is applied to the struts.

As will be appreciated, particularly as viewed in FIG. 3, the end 42 of the strut 22 is in substantially line contact with the discontinuous surface 38. This results in the desired action of the applied force being substantially tangential to the radius of the drum 20. Further, as will be noted, the strut 22 lies against the outer surface of the band 12 without intervening material comprised of the thickness of the bracket. This results in a reduced turning moment with respect to the drum surface and thus reduces toe-in of the ends of the brake band towards the drum surface. Reduced toe-in results in less wear of the friction material. Also, as a consequence of the strut 22 bearing directly against the discontinuous surface 38, there is no bending moment attributable to the bracket 26 which could further aggravate the toe-in problem.

Operation of the bracket 28 and anchor strut is substantially the same as above-described.

Figure 4:
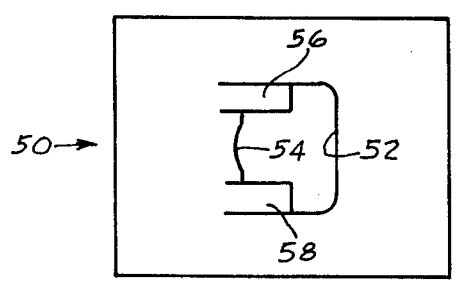
FIG. 4 is a plan view of a modified bracket construction.

FIG. 4 illustrates a modified form of the brackets. In FIG. 4, the bracket 50 is provided with a recess 52 in which the abutting surface 54 is in the center of the recess with the pair of locators 56, 58 being located adjacent thereto. As will be noted, the abutment surface 54 is curved as opposed to the straight surfaces previously described. Such a curved surface works in a manner comparable to a straight surface, the exact configuration of this surface not appearing to seriously affect operation of the bands.

Having thus described my invention, I claim:

1. A brake band comprising a flexible, arcuate, transversely split friction band element having a pair of free ends normally spaced from one another, means on said band element adapted to be engaged by actuating means to contract said band element, said means including a bracket secured to the radially outer surface of said band element adjacent one of said free ends thereof, said bracket having a plate portion disposed in surface-to-surface contact with said radially outer surface of said band element and having an end adjacent said one free end of said band element, said plate portion having a marginal edge projecting radially outwardly from said outer surface of said band element to the outer surface of said plate portion, said marginal edge extending transversely of said band element and facing away from said one free end of said band element to provide an abutment surface for said actuating means, said plate portion having an integral tang bent up from said plate portion at a point between said abutment surface and said end of said plate portion, said tang having a locator portion extending beyond said abutment surface to its free end in a direction away from said end of said plate portion, said locator portion being spaced from said outer surface of said band element a distance equal to or greater than the radial extent of said abutment surface, said locator portion and said outer surface of said band element serving to locate said actuating means when in contact with said abutment surface.

2. A brake band as defined in claim 1, wherein said abutment surface comprises two laterally spaced surface portions separated by said tang which is disposed centrally therebetween.

3. A brake band as defined in claim 1, wherein said tang comprises two laterally spaced tang portions separated by said abutment surface which is disposed centrally therebetween.

4. A brake band as defined in claim 1 including means for limiting transverse movement of said actuating means, comprising a marginal edge of said plate portion disposed at each side of said abutment surface and extending in a direction away from said end of said plate portion.

5. A brake band as defined in claim 1, wherein said plate portion has a part extending beyond said abutment surface in a direction away from said end of said plate portion which part is secured to said band element.

* * * * *